(12) United States Patent
Gerundt et al.

(10) Patent No.: US 9,249,893 B2
(45) Date of Patent: Feb. 2, 2016

(54) VALVE DEVICE HAVING A MOVEMENT ELEMENT WHICH IS CYLINDRICAL AT LEAST IN SECTIONS

(75) Inventors: Oliver Gerundt, Friolzheim (DE); Juergen Haller, Sachsenheim (DE); Rene Deponte, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 13/989,696

(22) PCT Filed: Sep. 27, 2011

(86) PCT No.: PCT/EP2011/066748
§ 371 (c)(1),
(2), (4) Date: Aug. 24, 2013

(87) PCT Pub. No.: WO2012/069236
PCT Pub. Date: May 31, 2012

(65) Prior Publication Data
US 2013/0323090 A1 Dec. 5, 2013

(30) Foreign Application Priority Data
Nov. 26, 2010 (DE) .......................... 10 2010 062 077

(51) Int. Cl.
*F16K 31/06* (2006.01)
(52) U.S. Cl.
CPC .............. *F16K 31/06* (2013.01); *F16K 31/0655* (2013.01)
(58) Field of Classification Search
CPC .............................. F16K 31/06; F16K 31/0655
USPC ............. 137/315.27, 625.28, 625.33, 625.37; 251/129.02, 129.07
See application file for complete search history.

(56) References Cited

U.S. PATENT DOCUMENTS

| 4,222,751 A | * | 9/1980 | Shunta | ............................ | 96/172 |
| 4,368,756 A | * | 1/1983 | Carlson | .......................... | 137/541 |

(Continued)

FOREIGN PATENT DOCUMENTS

| CN | 201014019 Y | 1/2008 |
| CN | 101191448 A | 6/2008 |

(Continued)

OTHER PUBLICATIONS

International Search Report corresponding to PCT Application No. PCT/EP2011/066748, mailed Jan. 17, 2012 (German and English language document) (5 pages).

*Primary Examiner* — John K Fristoe, Jr.
*Assistant Examiner* — Kevin Barss
(74) *Attorney, Agent, or Firm* — Maginot, Moore & Beck LLP

(57) ABSTRACT

A valve device has a movement element, which is cylindrical at least in sections, and a guide element, which has a guide recess for guiding the movement element and is pressed into a valve housing. The guide element comprises a radially inner ring-like section and a radially outer ring-like section. The guide recess is arranged in the inner ring-like section. On its outer circumference, the outer ring-like section has a number of contact sections which are arranged distributed uniformly over the circumference and by means of which the outer ring-like section is pressed into the valve housing. The inner ring-like section is connected to the outer ring-like section via an identical number of connecting sections, which are arranged distributed uniformly in the circumferential direction, wherein, as viewed in the circumferential direction, the connecting sections are offset radially by an angle of 180 DEG/N in relation to the contact sections.

12 Claims, 4 Drawing Sheets

(56) References Cited

U.S. PATENT DOCUMENTS

| | | | |
|---|---|---|---|
| 4,456,029 A | | 6/1984 | McCrum |
| 4,477,027 A | | 10/1984 | Knapp et al. |
| 4,535,808 A | * | 8/1985 | Johanson et al. ............. 137/543 |
| 5,069,239 A | | 12/1991 | Bunce et al. |
| 5,105,850 A | * | 4/1992 | Harris ..................... 137/513.3 |
| 5,293,898 A | * | 3/1994 | Masloff ..................... 137/517 |
| 5,564,471 A | * | 10/1996 | Wilder et al. ............ 137/614.04 |
| 6,182,912 B1 | * | 2/2001 | Muller et al. ............. 239/585.1 |
| 7,178,784 B2 | * | 2/2007 | Flynn ....................... 251/149.6 |
| 7,401,626 B1 | * | 7/2008 | Plattner ................... 137/614.03 |
| 2003/0188783 A1 | * | 10/2003 | Vicars ......................... 137/541 |
| 2007/0044848 A1 | * | 3/2007 | Norman ....................... 137/542 |

FOREIGN PATENT DOCUMENTS

| | | |
|---|---|---|
| DE | 198 33 461 A1 | 1/2000 |
| DE | 198 34 121 A1 | 2/2000 |
| DE | 103 27 411 A1 | 4/2004 |
| DE | 10 2004 016 554 A1 | 10/2005 |
| DE | 10 2004 061 798 A1 | 7/2006 |
| DE | 10 2005 022 661 A1 | 2/2007 |
| DE | 10 2007 028 960 A1 | 12/2008 |
| DE | 10 2007 034 038 A1 | 1/2009 |
| DE | 10 2008 043 237 A1 | 4/2010 |
| EP | 0 329 287 A2 | 8/1989 |
| EP | 1 296 061 A2 | 3/2003 |
| EP | 1 471 248 A1 | 10/2004 |
| EP | 1 701 031 A1 | 9/2006 |
| GB | 862 506 | 3/1961 |
| JP | 59-71063 U | 5/1984 |
| JP | 1-254595 A | 10/1989 |
| JP | 6-29715 U | 4/1994 |
| JP | 8-312799 A | 11/1996 |
| JP | 2004-156741 A | 6/2004 |
| JP | 2007-162906 A | 6/2007 |
| JP | 2009-526189 A | 7/2009 |
| KR | 20-0327572 Y1 | 9/2003 |
| KR | 10-2006-0114972 A | 11/2006 |
| KR | 10-0955442 B1 | 5/2010 |

* cited by examiner

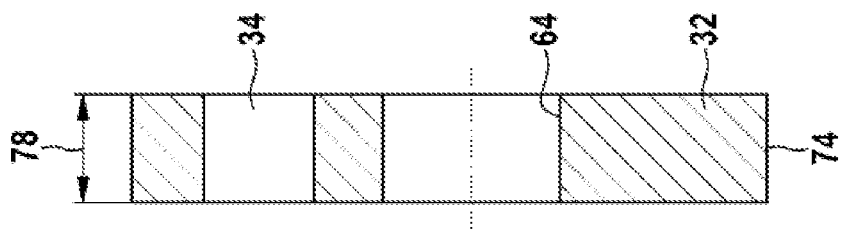
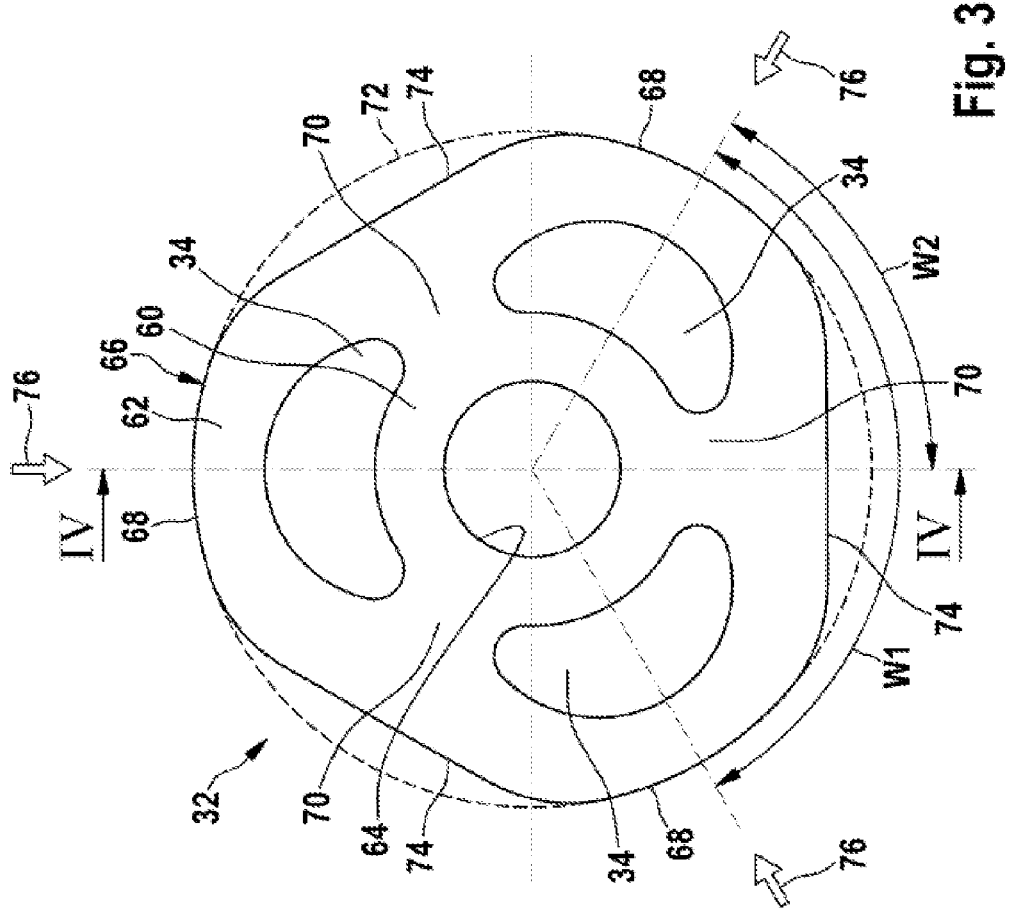

VALVE DEVICE HAVING A MOVEMENT ELEMENT WHICH IS CYLINDRICAL AT LEAST IN SECTIONS

This application is a 35 U.S.C. §371 National Stage Application of PCT/EP 2011/066748, filed on Sept. 27, 2011, which claims the benefit of priority to Serial No. DE 10 2010 062 077.7, filed on Nov. 26, 2010 in Germany, the disclosures of which are incorporated herein by reference in their entirety.

BACKGROUND

The disclosure relates to a valve device as described herein.

Magnetic switching valves are known commercially. The lifting movement of an armature is often transmitted therein to a valve member by means of a valve needle which can carry out the actual valve function at a sealing seat. The valve needle is generally guided on portions of a cylindrical outer face ("guiding faces"). Those guiding faces preferably have a hard surface so that the wear remains low over the service-life. This is particularly advantageous if those switching valves switch a brake fluid, a petroleum fuel or a diesel fuel and are flowed through thereby because those media have a low level of lubrication property. Therefore, it is advantageous to bring about the guiding of the needle by means of a separate component which is, for example, hardened. A cost-effective possibility of assembling that guiding component is to press the separate guiding component into a housing portion of the switching valve.

Patent publications from this technical field are, for example, DE 10 2008 043 237 A1, DE 10 2007 034 038 A1, DE 10 2007 028 960 A1, DE 10 2005 022 661 A1, DE 10 2004 061 798, DE 2004 016 554 A1, DE 103 27 411 A1, DE 198 34 121 A1, EP 1 701 031 A1, EP 1 471 248 A1, EP 1 296 061 A2 and DE 198 33 461 A1.

SUMMARY

The problem addressed by the disclosure is solved by a valve device as described herein. Advantageous developments are also disclosed herein. Features which are important to the disclosure further appear in the following description and the drawings, it being possible for the features to be important to the disclosure both alone and in different combinations without explicit reference again being made thereto.

In addition to the hardness of the component, the guiding play has a great influence on the component wear in the guiding region. During the operation described for pressing in the guiding component, it can scarcely still be the case according to the disclosure that pressing forces are transmitted from an outer portion of the guiding component to the radially inner bore which guides the valve needle. Consequently, that transmission of pressing forces is prevented from resulting in non-circularity of the inner bore and/or a reduction in the bore diameter. Consequently, this circumstance scarcely has to be considered any more when the guiding play is sized so that the nominal play is generally of very small size.

The valve device according to the disclosure has the advantage that a guide element for guiding a movement element—for example, a valve needle—can be pressed into a valve housing in such a manner that the pressing forces which abut a radially outer, annular portion of the guide element are substantially decoupled from a guide recess. The radial guiding play can thereby be reduced and the wear of the guide element or the valve needle can thereby be reduced. Pressing forces can further be reduced.

The disclosure is based on the consideration that the pressing forces which abut the radially outer annular portion result in principle in radially directed compression stresses which can reduce the cross-section of the guide recess. Therefore, the guide element has a radially inner annular portion ("inner portion") and a radially outer annular portion ("outer portion"). The outer portion has at its periphery a number N of contact portions which are arranged so as to be distributed preferably uniformly over the periphery and by means of which the guide element is pressed in the valve housing. As a result, it is possible for the pressing forces which act radially from the outer side to act on the guide element only at the contact portions.

Furthermore, according to the disclosure at a maximum a number N of connection portions are also arranged so as to be distributed preferably uniformly in a peripheral direction between the inner portion and the outer portion. Regions having a rigidity which is lower in relation to the connection portions are arranged radially or in the peripheral direction between the connection portions. According to the disclosure, the connection portions formed in that manner are arranged in a state offset in relation to the contact portions when viewed in the peripheral direction, again preferably by an angle of 180°/N. Consequently, the guide element is preferably constructed in a radially symmetrical manner in accordance with the number N. It will be understood that each connection portion itself may again have a plurality of portions of different rigidity as long as the rigidity of a connection portion is greater in total than that of the portion between two adjacent connection portions.

Owing to the offset of the contact portions in relation to the connection portions when viewed in the peripheral direction, the pressing forces which act on the guide element at the contact portions cannot be transmitted to the inner portion linearly in a radial direction. In simpler terms, it can be said that those forces are absorbed by deformations of the portions which are located between the connection portions and which have a lower level of rigidity. The guide recess is thereby substantially decoupled from the pressing forces and is accordingly deformed thereby only to a small extent.

One embodiment makes provision for the number N to be three. A guide element having three contact portions and three connection portions can be pressed inwards in a stable manner and results in a particularly small deformation of the guide recess. Such a guide element can further be produced in a simple and inexpensive manner.

The disclosed valve device is particularly advantageous if recesses are provided between the connection portions when viewed in the peripheral direction. It is thereby possible to provide in the guide element axial openings which are necessary for the operation of the valve device and through which, for example, fuel can flow. The recesses preferably have a number N which is correspondingly identical to the contact portions and the connection portions and they are also arranged so as to be uniformly distributed in the peripheral direction. In particular, the recesses can be arranged radially between the connection portions—in accordance with the above-described regions of lesser rigidity—so that the guide recess is relieved according to the disclosure. Consequently, the recesses fulfill two functions simultaneously and can further be produced in a cost-effective manner.

One embodiment of the valve device makes provision for the recesses to be kidney-like. The kidney shape may be constructed so as to have a sufficiently large cross-section for the passage of fuel and reduces locally increased mechanical stresses as a result of the spheroidal shape. It will be understood that the recesses may also be freely constructed in a manner other than in a kidney-like manner.

Another embodiment of the valve device makes provision for flattened portions to be provided between the contact portions on the outer periphery of the outer annular portion when viewed in the peripheral direction. The contact portions may be formed, for example, by means of the flattened portions located therebetween from a circular basic shape of the guide element. The flattened portions can be produced simply and cost-effectively and without a relatively large removal of material.

Furthermore, there is provision for the flattened portion to have a convex or concave outer contour. The outer portion can thereby be optimized with regard to the rigidity or the distribution of mechanical stresses. Therefore, a "web width" of the outer portion along the periphery can also be radially adapted, the radial symmetry of the guide element preferably being maintained. It will be understood that the "flattened portions" can also be "recesses" or the like having any other geometry.

The guide element has a simpler construction when it is produced in one piece. A one-piece guide element can be produced in one operating step and has in all portions a defined strength which is substantially dependent on the material and the geometry of the guide element.

It is further proposed that the guide element be produced by means of stamping, a chip-removal method or MIM ("metal injection molding"). The guide element can thereby be produced in a cost-effective and precise manner in accordance with its specific construction with a suitable method, respectively. For example, a stamping operation requires a specific minimum width of the portions of the guide element in relation to the material thickness. A method of plastics injection molding is also possible according to the disclosure in order to produce the guide element.

The valve device can be used in particular to switch fuel, hydraulic oil or brake fluid. In these applications, it is necessary to guide the movement element for the valve function in a particularly precise manner. This is achieved in that the guide recess can be produced according to the disclosure with comparatively little play. Furthermore, the recesses of the guide element can be integrated in the valve function by allowing the throughflow of fuel, oil or brake fluid.

Another embodiment of the valve device makes provision for it to be a quantity control valve of a high-pressure fuel pump. Quantity control valves are used for precisely metering the fuel quantity supplied to the high-pressure pump. The guiding properties of the guide element improved according to the disclosure have an advantageous effect.

BRIEF DESCRIPTION OF THE DRAWINGS

Exemplary embodiments of the disclosure will be explained below with reference to the drawings, in which:

FIG. 3 is a top view of a guide element; and

FIG. 4 is a sectional view Iv-Iv of the guide element of FIG. 3.

DETAILED DESCRIPTION

Figure 1:
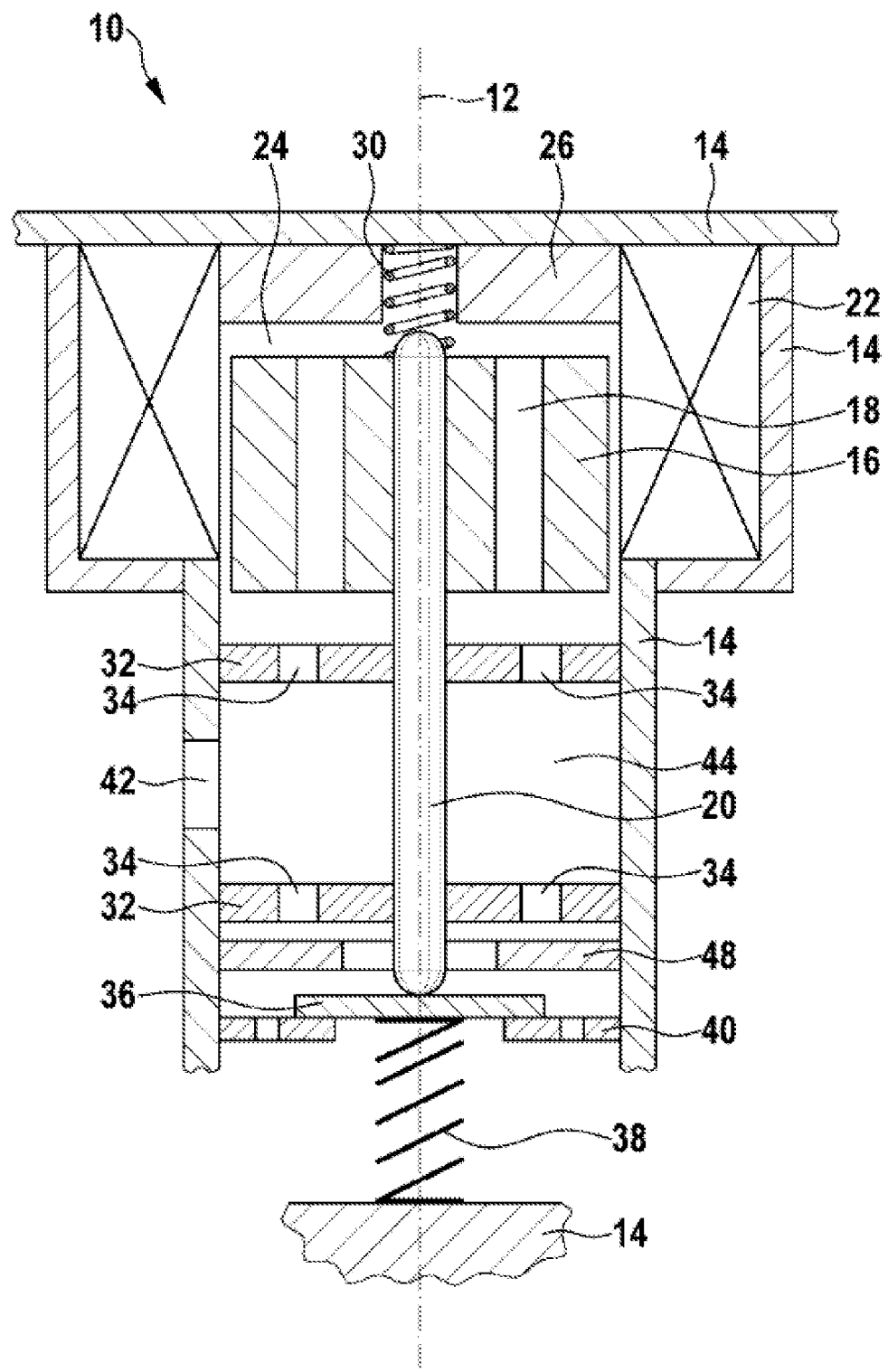
FIG. 1 is a partially sectioned, simplified diagram of a valve device.

The same reference numerals are used for functionally equivalent elements and variables in all the Figures even for different embodiments.

FIG. 1 is a partially sectioned, highly schematic and simplified view of a valve device 10. The valve device is an element of a quantity control valve of an internal combustion engine which is not illustrated and is constructed in a substantially rotationally symmetrical manner about a longitudinal axis 12. The valve device 10 comprises a plurality of different portions of a housing 14, in which elements of the valve device 10 are arranged. An axially movable armature 16 which has axial armature bores 18 is arranged in an upper region of the drawing. The armature 16 is rigidly secured to an end region of a valve element 20, which end region is in the upper portion of the drawing. The valve element 20 is movable and consequently constitutes a movement element 20. An end face of the armature 16, which end face is in the upper portion of the drawing, is spaced apart from a pole core 26 by means of an armature gap 24 in the shown axial position of the armature 16. The winding of a coil 22 of the valve device 10 is arranged radially around the armature 16 and the pole core 26. An armature spring 30, which acts on the armature 16—and therefore the valve element 20—downwards in the drawing is arranged above the armature 16 between the armature 16 or an end portion of the valve element 20 and a portion of the housing 14. The valve element 20 is radially guided by means of two guide elements 32. The guide elements 32 have recesses 34, through which fuel can flow in an axial direction.

An end region (in the lower position in the drawing) of the valve element 20 has stopped against a plate-like valve member 36. The valve element 20 acts on the valve member 36 in a downward direction in the drawing counter to the force of a valve spring 38 so that the valve member 36 adjoins a rest seat 40. The valve spring 38 is supported on a portion of the housing 14.

The housing 14 further comprises a radial opening 42, through which fuel can flow into a fluid chamber 44 of the valve device 10. A sealing seat 48, against which the valve member 36 can stop, is arranged above the valve member 36 in the drawing.

FIG. 1 illustrates the opened state of the valve device 10. The coil 22 is not supplied with electrical power and the valve member 36 is acted on by means of the armature spring 30 and the valve element 20 in the open position shown.

When the coil 22 is supplied with electrical power, the armature 16 is attracted by the pole core 26 by magnetic force in an upward direction in the drawing so that the armature gap 24 substantially disappears. The valve spring 38 acts on the valve member 36 counter to the sealing seat 48 in an upward direction in the drawing so that the valve device 10 can close.

Figure 2:
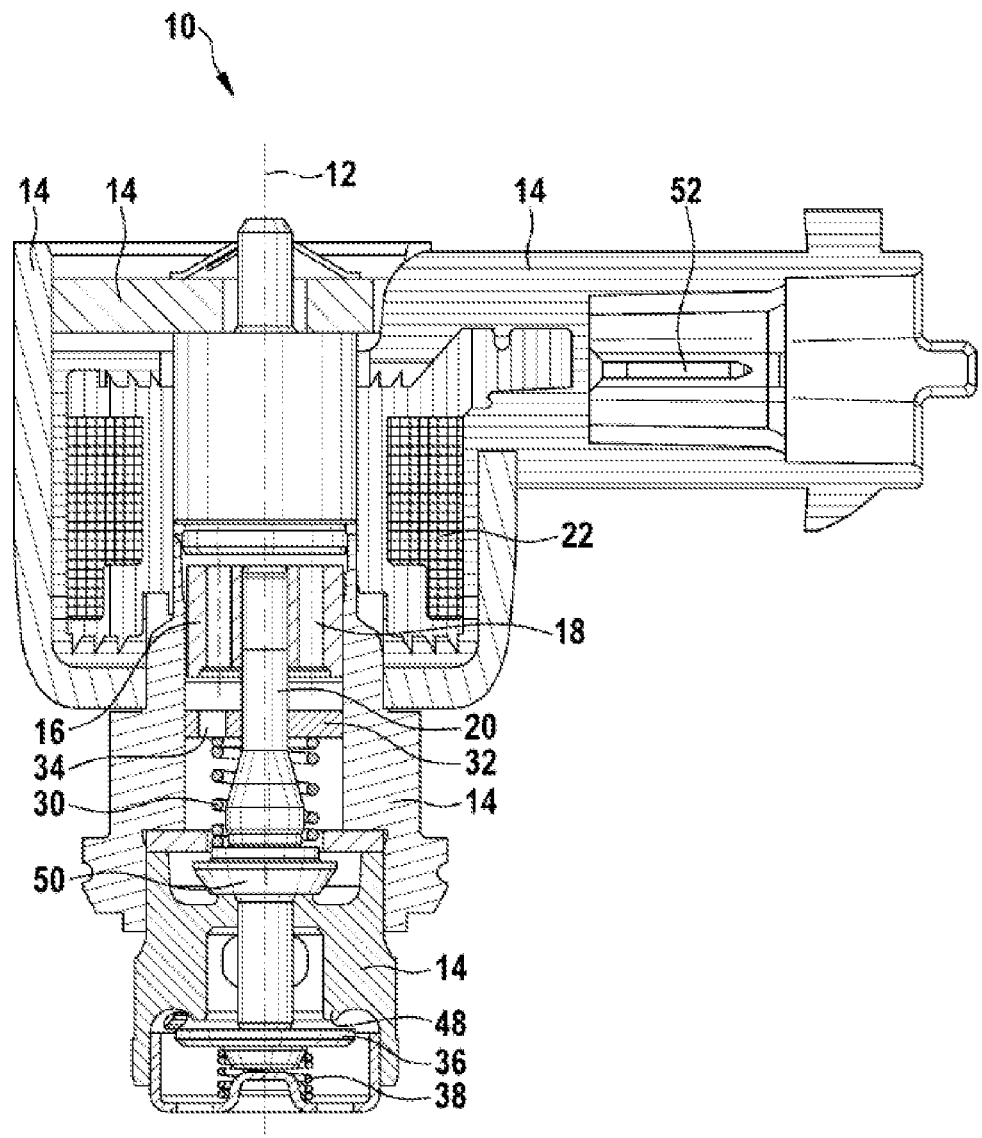
FIG. 2 is a partially sectioned view of a quantity control valve.

FIG. 2 is a partially sectioned illustration of a quantity control valve 10 of a high-pressure fuel pump of an internal combustion engine. The fundamental construction and the fundamental function are at least similar to the valve device 10 of FIG. 1. Therefore, the respective elements can be identified by their reference numerals.

In the valve device 10 of FIG. 2, the armature spring is arranged between the guide element 32 and a needle collar 50, the armature spring 30 also acting on the valve element 20 downwards in the drawing. The guide element 32 is pressed in the housing 14. The recess 34 is illustrated by way of example. A contact member 52 for connection of the coil 22 is arranged in an upper right-hand region of FIG. 2.

FIG. 3 is a plan view of the guide element 32. The guide element 32 is constructed in a radially symmetrical manner in accordance with a number N (this is discussed in greater detail below) and comprises a radially inner annular portion 60 ("inner portion 60") and a radially outer annular portion 62 ("outer portion 62"). The number N is three. A guide recess 64 is constructed as the central bore in the inner portion 60. The outer portion 62 has at the outer periphery 66 thereof N=three contact portions 68 which are arranged so as to be uniformly distributed over the periphery and which form an angle W1 of 120° relative to each other. The inner portion 60 is also connected to the outer portion 62 by means of N=3 connection portions 70 which are arranged so as to be uniformly distributed in the peripheral direction. When viewed in the peripheral direction, the connection portions 70 are offset by an angle W2 in relation to the contact portions 68. The angle W2 results from the formula $W2=180°/N=60°$, with $N=3$ in this instance.

The recesses 34 which are of kidney-like shape in this instance are arranged between the connection portions 70. The outer portion 62 is arranged inside a circumscribed circle 72, the outer portion 62 having three flattened portions 74 in relation to the circumscribed circle 72 between the contact portions 68. In this instance, the flattened portions 74 are constructed so as to be "flat".

The guide element 32 which is produced in this instance in one piece by a stamping operation is pressed by means of the three contact portions 68 into a radially inner cylindrical portion of the housing 14. An inner radius of the housing portion is slightly smaller than the radius of the circumscribed circle 72 in order to allow the desired pressing force and strength. The radial forces which act on the guide element 32 in the pressed-in state are symbolically indicated by three arrows 76.

It can be seen that the pressing forces in the direction of the arrows 76 act on the contact portions 68 or the outer portion 62, but cannot be transmitted radially inwards from that location because the recesses 34 prevent this. The pressing forces are received by deformations of the recesses 34. The guide recess 64 is thereby powerfully decoupled from the pressing forces which act on the contact portions 68. Therefore, the geometry or the radius of the guide recess 64 remains substantially unchanged. Accordingly, the radial play necessary for guiding the movement element 20 does not require any tolerances or requires only small additional tolerances in order to take into consideration possible deformations of the guide recess 64 as a result of the pressing.

FIG. 4 is a sectional view of the guide element 32 of FIG. 3 along a line IV-IV. The guide element 32 has a thickness or material size 78.

Figure 6:
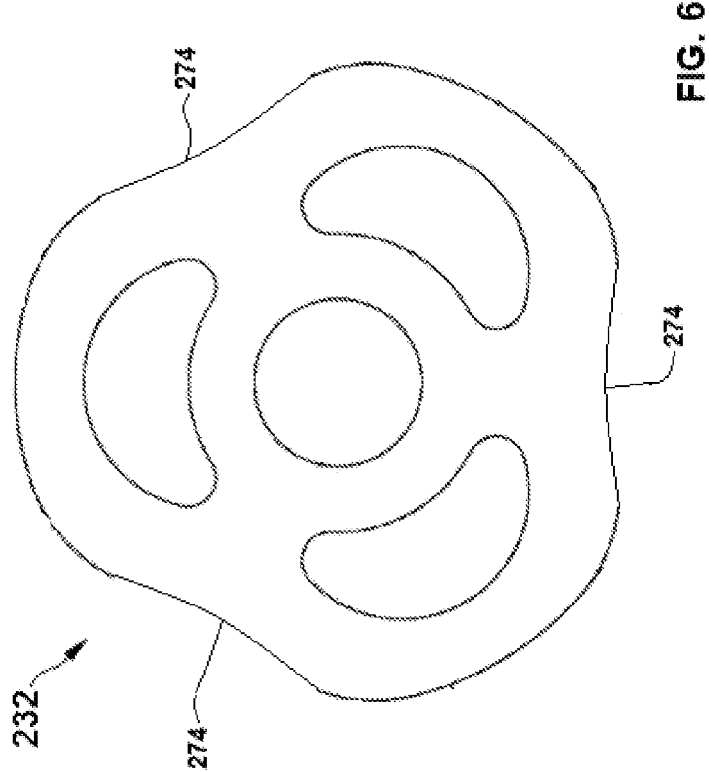
FIG. 6 is a top view of an embodiment of a guide element having flattened portions with a concave outer contours.
Figure 5:
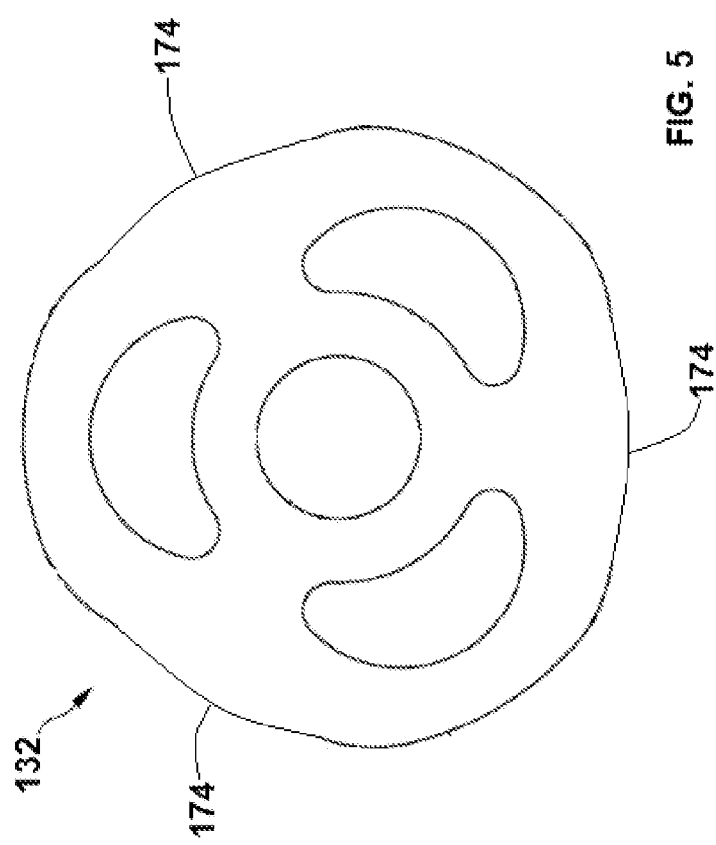
FIG. 5 is a top view of an embodiment of a guide element having flattened portions with a convex outer contour.

In one embodiment, as shown in FIG. 5, a guide element 132 includes flattened portions 174 that have a convex outer contour. In another embodiment, as shown in FIG. 6, a guide element 232 includes flattened portions 274 that have a concave outer contour.

It will be understood that it is not absolutely necessary for the contact portions 68, the recesses 34 and/or the connection portions 70 to be distributed uniformly over the periphery. It is also possible according to the disclosure for the number of contact portions 68 also to be able to be greater than the number of connection portions 70.

The invention claimed is:

1. A valve device comprising:
   a valve housing;
   a movement element; and
   a guide element which defines a guide recess for guiding the movement element and which is press-fit in the valve housing,
   wherein the guide element includes a radially inner annular portion and a radially outer annular portion,
   wherein the guide recess is defined in the radially inner annular portion,
   wherein the radially outer annular portion includes contact portions at an outer periphery thereof, and the contact portions are press-fit into the valve housing,
   wherein the radially inner annular portion is connected to the radially outer annular portion by connection portions positioned so as to be offset in relation to the contact portions when viewed in a peripheral direction,
   wherein flattened portions are defined between the contact portions on the outer periphery of the outer annular portion when viewed in the peripheral direction;
   wherein the valve housing defines a continuous, circular inner surface; and
   wherein the contact portions of the guide element are press-fit into the continuous, circular inner surface of the valve housing.

2. The valve device as claimed in claim 1, wherein:
   the radially outer portion includes a number N of contact portions positioned so as to be distributed over the outer periphery at least substantially uniformly, and
   the connection portions are positioned so as to be offset by an angle of approximately 180°/N relative to the contact portions.

3. The valve device as claimed in claim 2, wherein the quantity of connection portions is equal to or less than the number N of contact portions.

4. The valve device as claimed in claim 2, wherein the radially outer portion includes three contact portions.

5. The valve device as claimed in, claim 1, wherein recesses are defined between the connection portions when viewed in the peripheral direction.

6. The valve device as claimed in claim 5, wherein the recesses are kidney-shaped.

7. The valve device as claimed in claim 1,
   wherein the flattened portions each have a convex outer contour.

8. The valve device as claimed in claim 1, wherein the guide element is produced in one piece.

9. The valve device as claimed in claim 1, wherein the guide element is produced by one of stamping, a chip-removal method, and metal injection molding.

10. The valve device as claimed in claim 1, wherein the valve device is used to switch fuel, hydraulic oil or brake fluid.

11. The valve device as claimed in claim 1, wherein the flattened portions each have a concave outer contour.

12. The valve device as claimed in claim 1, wherein:
    the guide recess defines a central longitudinal axis; and
    a radial distance between the longitudinal axis and each of the flattened portions is less than a radial distance between the longitudinal axis and each of the contact portions.

* * * * *